T. B. WYLIE.
APPARATUS FOR MEASURING VOLUME OF FLOWING WATER, &c.
APPLICATION FILED SEPT. 11, 1909.
1,025,227.
Patented May 7, 1912.
2 SHEETS—SHEET 1.
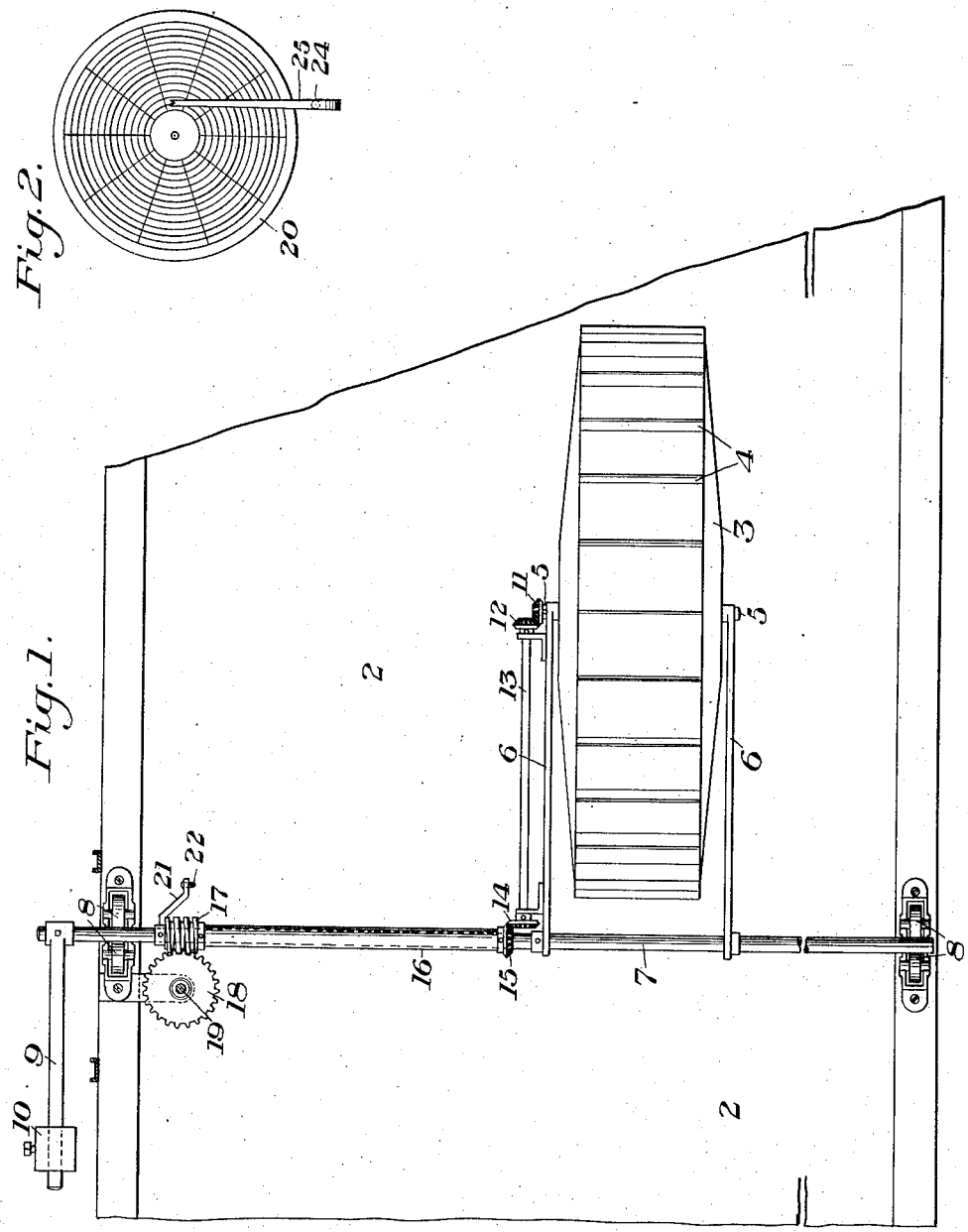

T. B. WYLIE.
APPARATUS FOR MEASURING VOLUME OF FLOWING WATER, &c.
APPLICATION FILED SEPT. 11, 1909.
1,025,227.
Patented May 7, 1912.
2 SHEETS—SHEET 2.
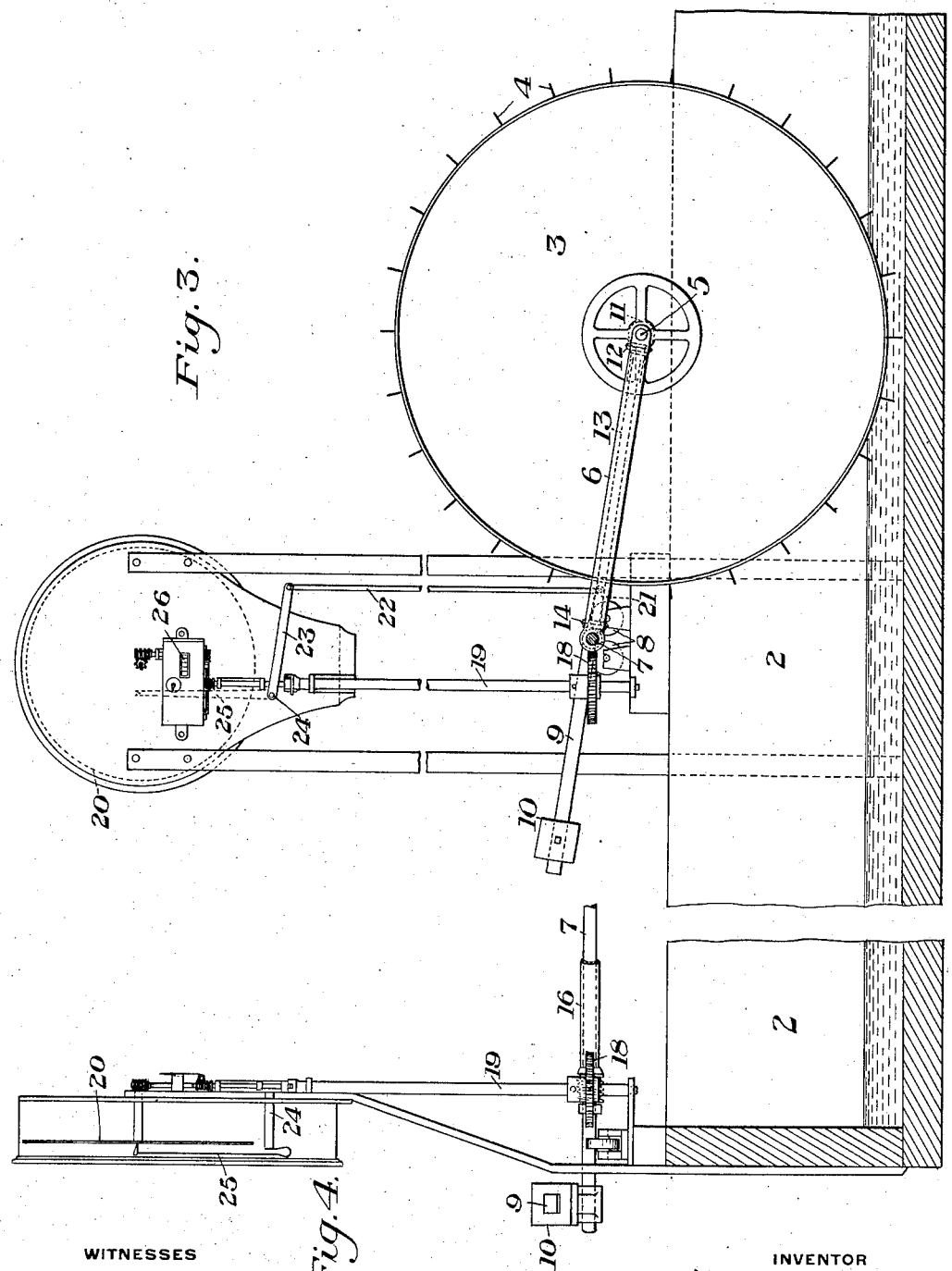

UNITED STATES PATENT OFFICE.

THOMAS B. WYLIE, OF HAYSVILLE, PENNSYLVANIA.

APPARATUS FOR MEASURING VOLUME OF FLOWING WATER, &c.

1,025,227. Specification of Letters Patent. Patented May 7, 1912.

Application filed September 11, 1909. Serial No. 517,325.

*To all whom it may concern:*

Be it known that I, THOMAS B. WYLIE, of Haysville, in the county of Allegheny and State of Pennsylvania, have invented a new and useful Apparatus for Measuring Volume of Flowing Water, &c., of which the following is a full, clear, and exact description, reference being had to the accompanying drawings, forming part of this specification, in which—

Figure 1 is a plan view, with certain of the parts removed, of one form of apparatus embodying my invention. Fig. 2 is a detail view showing the recording dial. Fig. 3 is a sectional side elevation, and Fig. 4 is a sectional end elevation.

My invention has relation to apparatus for measuring the volumes of water or other liquids flowing through a flume or other conduit; and is designed to provide apparatus of this character which is simple in its construction and operation and which will accurately measure and record or indicate the volume of water to be measured.

The nature of my invention will be best understood by reference to the accompanying drawings, in which I have shown the preferred embodiment thereof, and which will now be described, it being premised, however, that various changes may be made in the details of construction and arrangement of the several parts without departing from the spirit and scope of my invention, as defined in the appended claim.

In these drawings, the numeral 2 designates a flume or other conduit, the flow of the water or liquid through which is desired to be measured.

3 designates a float wheel, which is in the form of a hollow, buoyant drum, provided with peripheral blades or paddles 4. This drum is secured to a central shaft 5 which is journaled in parallel arms 6 which are secured at their opposite ends to a rock shaft 7. The shaft 7 is mounted on suitable bearings, such as the anti-friction rollers 8, and is provided with an arm 9 having thereon an adjustable counterweight 10. The drum 3 is placed transversely within the flume 2 and the counterweight is so adjusted as to hold the drum immersed to the proper extent in the flowing water. Upon one end of the drum shaft 5 is secured a beveled tooth pinion 11 which meshes with a corresponding pinion 12 on a shaft 13 which extends parallel with the arm 6 and is supported in bearings carried by one of said arms. The other end of said shaft has secured thereto a beveled gear wheel 14 which meshes with a similar wheel 15 on a sleeve 16 surrounding the rock shaft 7. Secured to said sleeve is a worm 17 which meshes with a worm wheel 18 on a vertical shaft 19. This shaft 19 is geared to an index card 20 of a recording instrument, which is preferably of the character described and claimed in my prior Patent No. 796,620 of August 8, 1905, to which reference may be had for a more complete description.

The shaft 7 has connected thereto a crank arm 21; and this crank arm is connected by a link 22 with the arm 23 of a rock shaft 24. Connected to this shaft 24 is a pencil carrying arm 25 similar to the pencil carrying arm of my said patent. The water flowing through the flume causes a rotation of the float drum 3, and through the gearing described operates the index card and registering mechanism 26 to indicate the lineal feet of water passing through the flume. The index card, as, in my said patent, is graduated by means of radial and circular lines, the circular movement of the dial indicating the velocity of the water and the movement of the pencil on the radial lines indicating the changes in depth of the flowing water. The instrument may be provided with indicating wheels 26 to give a direct reading of the flow of water.

The advantages of my invention result from the simplicity of the apparatus, there being few parts and those of a character not likely to get out of order; and also from the fact that the apparatus can be readily and quickly set up at any desired point where it is desired to take a measurement of the flowing liquid.

It will be obvious that many changes may be made in the details of the gearing, the meter, and other parts, without departing from the spirit and scope of my invention.

What I claim is:

In apparatus of the character described, a short buoyant float drum of large diameter and having peripheral blades or paddles, a rotary shaft having secured thereto a pair of projecting arms between which the drum is mounted, and which are provided with bearings for the shaft of the drum, indicating gearing arranged to be actuated by the oscillating movement of said rotary shaft imparted by the drum, and other indicating mechanism geared to the drum and actuated by its rotation; substantially as described.

In testimony whereof, I have hereunto set my hand.

THOMAS B. WYLIE.

Witnesses:
  GEO. H. PARMELEE,
  H. M. CORWIN.

Copies of this patent may be obtained for five cents each, by addressing the "Commissioner of Patents, Washington, D. C."